May 2, 1944.                R. S. DRUMMOND                2,347,997
METHOD OF GEAR FINISHING
Original Filed Dec. 12, 1938    3 Sheets—Sheet 1
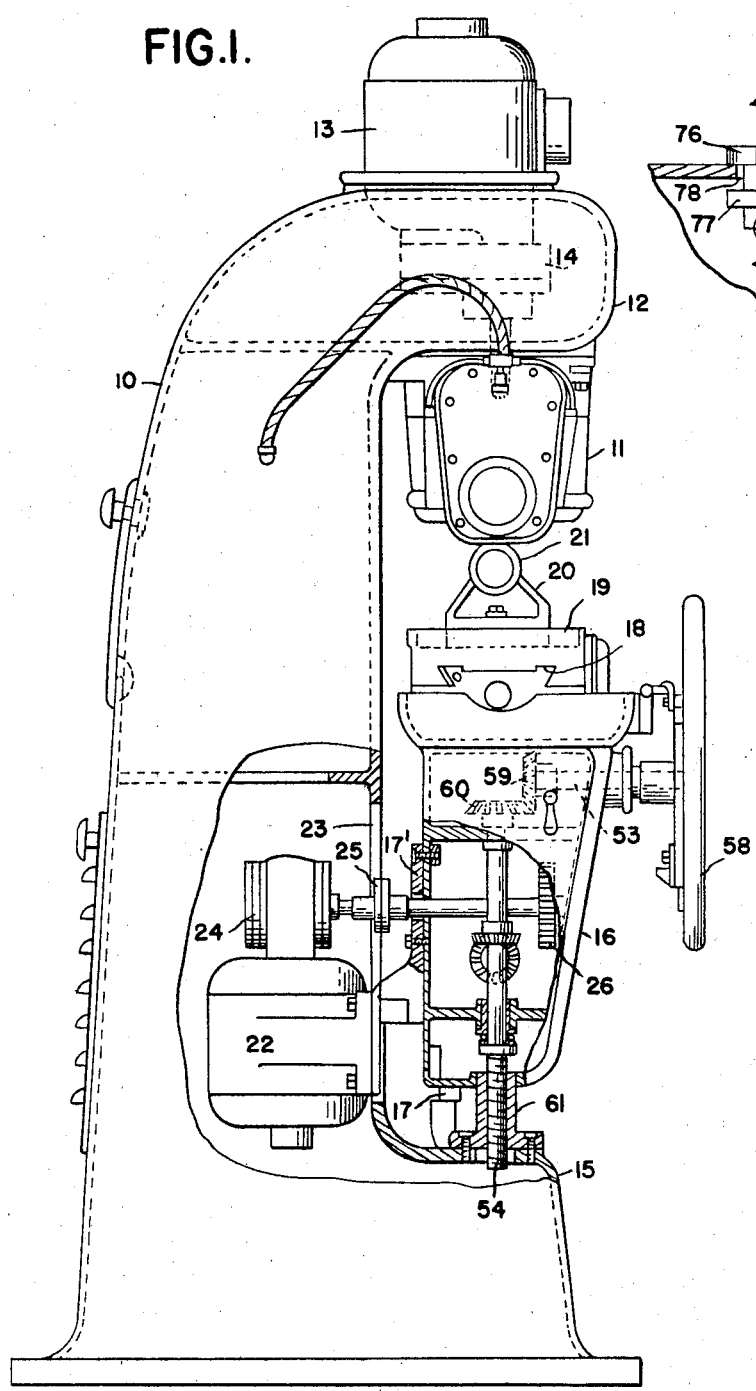
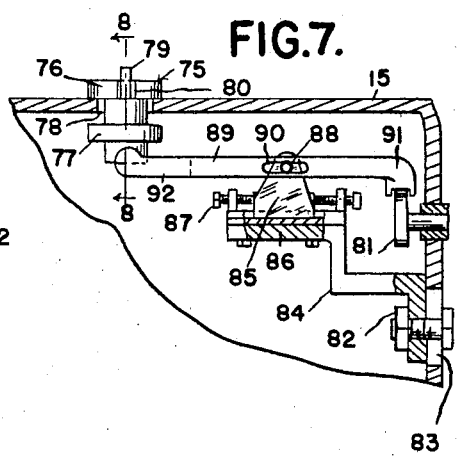
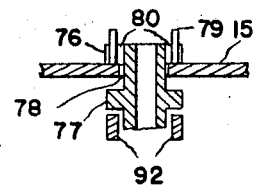
INVENTOR
ROBERT S. DRUMMOND
BY Whittemore, Hulbert
& Belknap ATTORNEYS May 2, 1944.  R. S. DRUMMOND  2,347,997
METHOD OF GEAR FINISHING
Original Filed Dec. 12, 1938  3 Sheets-Sheet 2
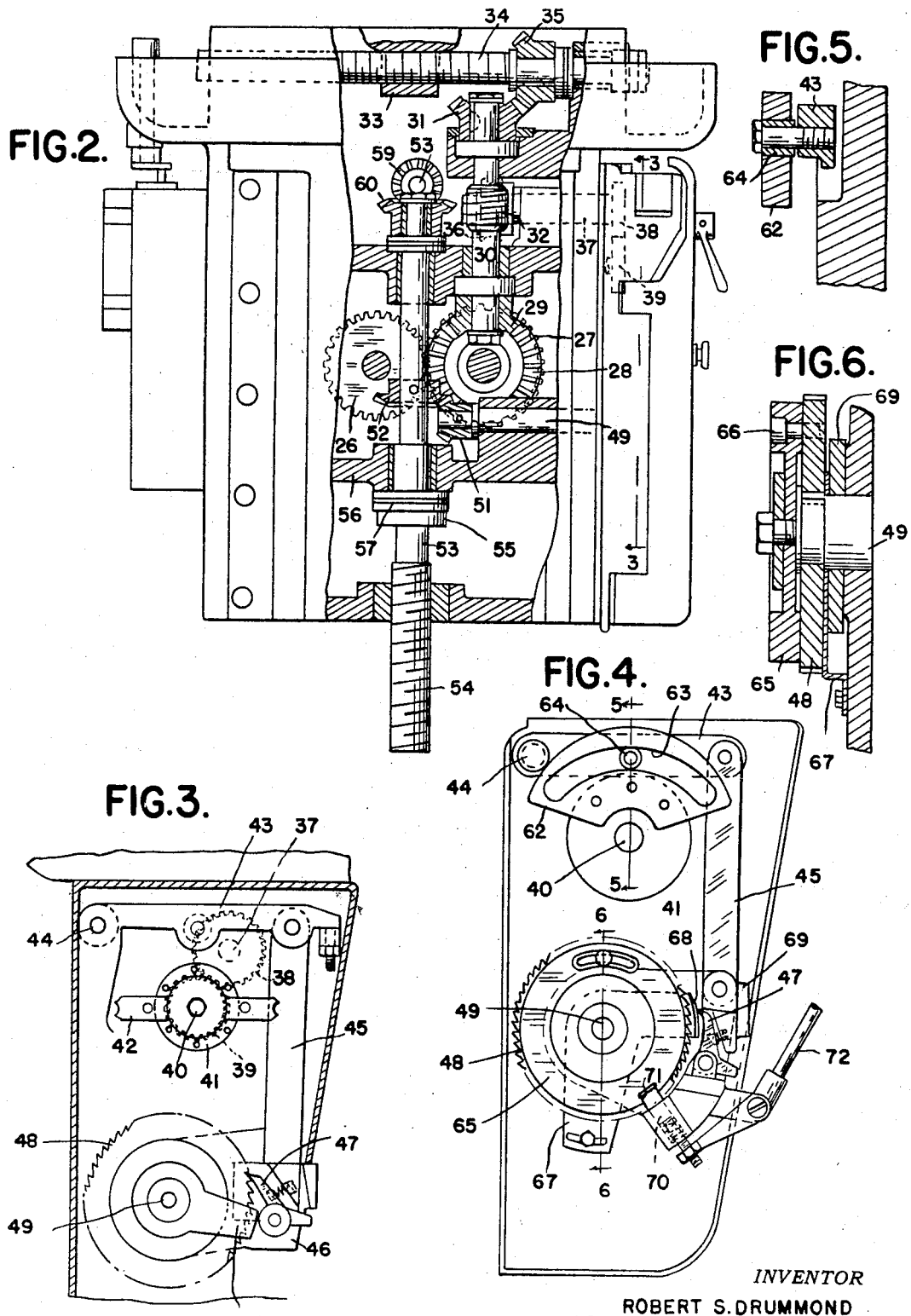
INVENTOR
ROBERT S. DRUMMOND
BY Whittemore, Hulbert
& Belknap
ATTORNEYS May 2, 1944.  R. S. DRUMMOND  2,347,997
METHOD OF GEAR FINISHING
Original Filed Dec. 12, 1938   3 Sheets-Sheet 3
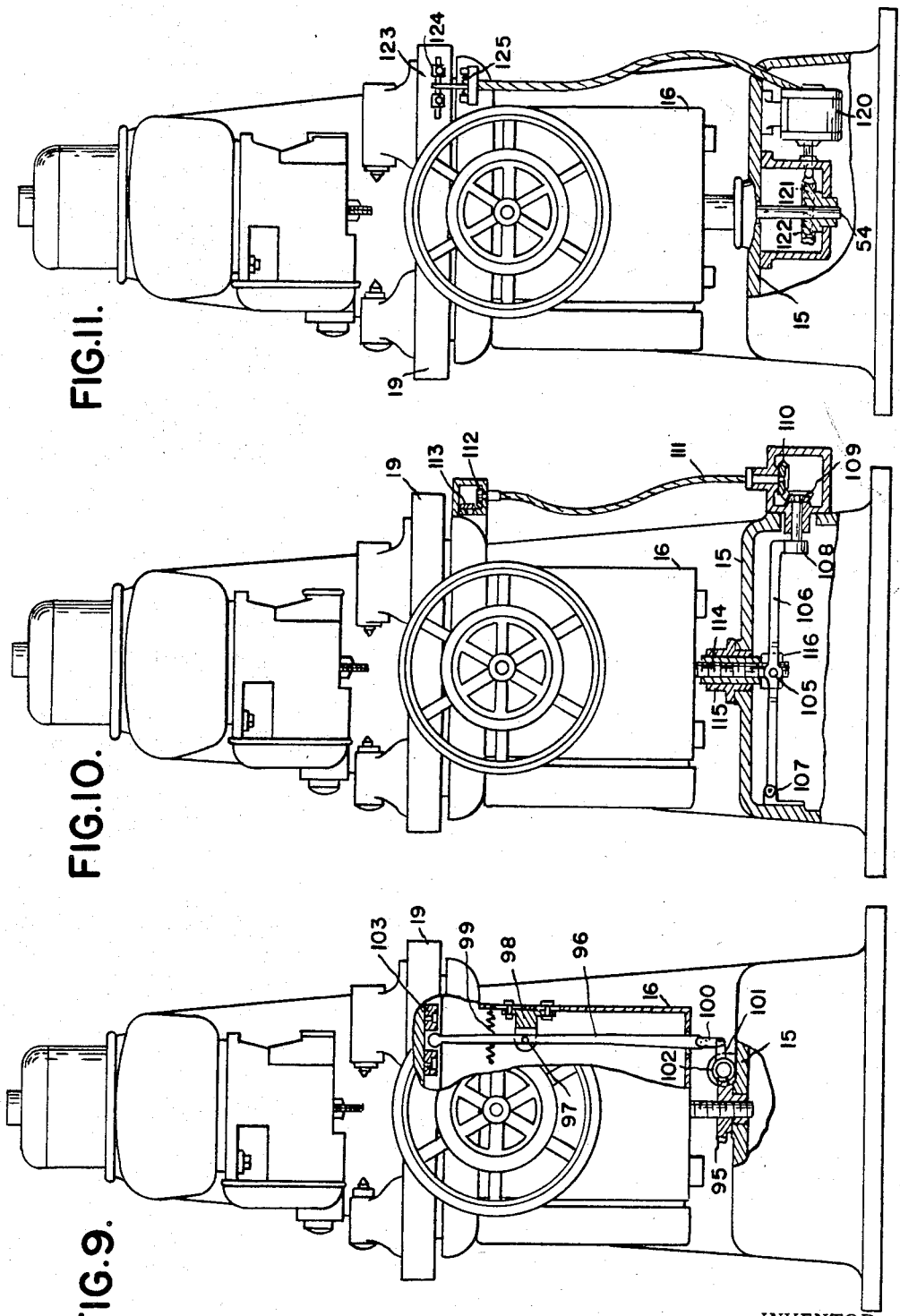
INVENTOR
ROBERT S. DRUMMOND
BY Whittemore, Hulbert
& Belknap ATTORNEYS Patented May 2, 1944

2,347,997

UNITED STATES PATENT OFFICE 2,347,997

METHOD OF GEAR FINISHING

Robert S. Drummond, Detroit, Mich.

Original application December 12, 1938, Serial No. 245,324. Divided and this application June 3, 1940, Serial No. 338,613

10 Claims. (Cl. 90—1.6)

The present invention relates to a method of finishing gears and more particularly to a method of crowning gears, and is a division of my copending application Serial No. 245,324, "Gear crowning machine," filed December 12, 1938.

Briefly described the method as illustrated herein is carried out by a gear finishing machine which provides a work arbor and a tool arbor which are relatively adjustable so that they may be set with their axes crossed, preferably at an angle of less than 30°. A tool in the form of a gear having cutting edges provided on the working faces of its teeth is supported on the tool arbor. The helix angle of the teeth of the tool are selected such that the gear to be finished and the tool mesh with their axes crossed as indicated.

Means are provided for positively rotating one of the aforementioned arbors, the other of said arbors being mounted for free rotation. Due to the crossed axes relationship a cross sliding action between the tool and the work piece is developed which removes metal from the working faces of the teeth of the work piece. Due also to the crossed axial relationship the instantaneous contact between the teeth of the tool and the teeth of the work piece is limited theoretically to the point; and practically, due to deformation of the metal and provision of the cutting edges, to a limited area. During rotation of the tool and work piece the point of instantaneous contact moves from top to bottom, or bottom to top, of the gear teeth.

In order to distribute the cutting action of the tool endwise across the working faces of the gear teeth, a relative translation between the work arbor and the tool arbor is introduced. This translation may be effected by reciprocating either the work arbor or the tool arbor, or both, and is limited to a plane which is parallel to both of said axes.

In the present embodiment I have illustrated this translation as resulting from an axial reciprocation of the work arbor, although if desired the work arbor may be translated in a direction transverse to its axis, or the gear arbor may be translated to cause a corresponding relative translation.

The axes of the work piece and tool are retained in rigidly spaced relation during such translation with the result that a predetermined amount of metal is shaved from the working faces of the gear teeth. In order that the machine may be fully automatically operated, I provide means which causes the axes of the gear and work piece to be relatively fed towards each other at the end of each translation. The mechanism for obtaining this result will be described subsequently in detail, and is further clearly set forth in my copending application referred to above.

It will be understood that the operation of the machine as thus far described would result in accurately finishing the teeth of the work gear uniformly from end to end. In many cases it is desirable to provide a slight crowning effect to the teeth of the work gear. As is well understood, crown teeth have their bearing with teeth of a meshing gear shifted centrally thereof which permits silent gear action, even though slight misalignment of the gear supporting shafts is present. In addition crowned gear teeth operate more silently even though they have properly aligned axes since engaging teeth come into contact more gradually and have less face contact. In some cases, also, crowned teeth are desirable to allow angular setting of mating parts.

In order to provide the finished gear teeth with a predetermined crown effect, I provide additional means for gradually varying the normal spacing of the work arbor and the tool arbor in accordance with the translation.

The gear tooth is finished so that it is crowned at its mid-portion and has both ends gradually relieved. This effect as will be evident may be obtained in the present machine by causing the work arbor to be raised and lowered relative to the tool arbor in timed relation to the translation, the timed relation being such that the work arbor is elevated at both ends of a translation stroke and is at its lowermost position in mid-stroke of each translation.

While the method as thus far described is intended to be carried out with one of the machines described, it is obvious that in its broader aspects the invention may be practiced with prior gear finishing machines of the crossed axes type by suitable manual manipulation. As a practical matter, of course, commercial gear teeth could not be crowned satisfactorily in production manually, but this statement is made to emphasize the fact that the novel method is not limited to the finishing by a particular machine.

With the foregoing general remarks in mind, it is an object of the present invention to crown gear teeth by gradually varying the distance between the gear axis and tool axis in accordance with relative translation.

It is a further object of the present invention to crown gear teeth by causing the axes of a gear and gear-like tool meshed at crossed axes to approach and separate in accordance with relative translation and without disturbing the orientation of the axes.

It is a further object of the present invention to crown gear teeth by meshing a gear and gear-like finishing tool at crossed axes, providing a relative translation between the gear and tool and to distribute the finishing action from end to end of the gear teeth, adjusting the spacing of the axes gradually in accordance with said translation, and providing an incremental step feed at the end of a translation.

Other objects of the invention will be apparent as the description proceeds and when taken in conjunction with the accompanying drawings, and wherein:

Figure 1 is a side elevation with parts broken away showing a gear finishing machine;

Figure 2 is an enlarged rear elevation of the table of my gear finishing machine with parts broken away;

Figure 3 is a section on the line 3—3, Figure 2;

Figure 4 is a view similar to Figure 3 in which a crowning attachment has been added to the actuating mechanism;

Figure 5 is a section on the line 5—5, Figure 4;

Figure 6 is a section on the line 6—6, Figure 4;

Figure 7 is a vertical section of a modified crowning control mechanism;

Figure 8 is a section on the line 8—8, Figure 7; and

Figures 9, 10 and 11 are front elevations of the parts in section showing modified forms of crowning mechanism.

In Figures 1, 2 and 3 I have illustrated a gear finishing machine having a frame 10 which supports a tool head 11. The tool head is mounted for adjustment about a vertical axis relative to an overhanging portion 12 of the frame. Motor 13 is carried by the portion 12 of the frame and is adapted to drive a tool which is rotatably supported in the tool head 11 through suitable driving mechanism 14. Details of this driving mechanism form no part of the present invention and are fully described in my prior Patent 2,157,981.

The frame 10 has a forwardly projecting knee 15 above which is supported for vertical adjustment a table 16. The table 16 is accurately guided for vertical adjustment relative to the frame 10 in suitable cooperating ways indicated in part in Figure 1 at 17.

Carried by the table 16 and horizontally adjustable thereon in ways 18 is a carriage 19 having a support 20 thereon for a gear arbor indicated generally at 21.

A motor 22 is secured to the table 16 by a bracket 17', the motor being received within the hollow frame 10 and connected to suitable driving mechanism carried by the table 16 through a slot 23 formed in the forward face of a frame 10. As will now be described in detail the motor 22 is adapted to reciprocate the carriage 19 horizontally and to elevate the table 16 periodically, and also as will subsequently be described to control vertical motion of the table 16 in order to crown the teeth of the work piece.

Motor 22, as seen in Figure 1, is connected through suitable speed control mechanism 24 and flexible coupling 25 to a gear 26. Gear 26 as indicated in Figure 2 is adapted to mesh with and drive a gear 27, which in turn drives a coaxial bevel gear 28. The bevel gear 28 in turn meshes with and drives a second bevel gear 29 secured to a vertically extending shaft 30. Shaft 30 has keyed or otherwise secured thereto a bevel gear 31 and a worm 32.

The horizontally movable carriage 19 has a depending lug 33 which is internally threaded to cooperate with a threaded horizontal feed screw 34 journalled for rotation in the vertically adjustable table. As will be apparent from Fig. 2, rotation of the feed screw 34 will cause the slow translation of the carriage 19. Feed screw 34 has keyed or otherwise secured thereto a bevel gear 35 meshing with bevel gear 31. From the foregoing, it will be apparent that operation of the motor 22 through the medium of gears 26, 27, 28, 29, 31 and 35 causes a slow translation of the carriage 19 relative to the table 16.

The worm 32, previously referred to, is adapted to mesh with and drive a worm gear 36 which is connected to a shaft 37. The shaft 37, as best seen in Figure 3, has connected thereto a gear 38 adapted to mesh with a gear 39 carried by a shaft 40, the shaft 40 also carrying a feed actuating device 41. Feed actuating device 41 comprises a pair of radially extending arms 42 which are adapted to engage a lever 43 pivoted at 44. Lever 43 has connected to its free end a link 45 which in turn is connected to a feeding device indicated generally at 46.

The feeding device 46 includes a spring pressed dog 47 which is adapted to cooperate unidirectionally with a ratchet wheel 48 carried by a shaft 49. An adjustable sheet metal mask 50 is movable with the ratchet wheel 48 and, as will be evident, when the mask reaches the spring pressed dog 47 the dog 47 will be ineffective to further actuate the ratchet wheel. The mask 50 has a portion (not shown in Figure 3) which is adapted to overlie the teeth of the ratchet wheel. The shaft 49 referred to above is shown in Figure 3 and its driving connection to the work table 16 is best seen in Figure 2. The shaft 49 carries at its free end a bevel pinion 51 which in turn meshes with a bevel gear 52 keyed or otherwise secured to a vertical shaft 53. The shaft 53 has a table feed screw portion 54 formed thereon or attached thereto. In addition the shaft 53 is adapted to support the table 16 through the medium of a flange 55 upon which is engaged a transverse partition 56 of the table, suitable bearings 57 being provided.

As will be apparent from the foregoing, rotation of the motor in addition to causing a translation of the carriage 19 rotates feed actuating device 41 through the medium of worm 32 and worm gear 36. Rotation of the table feed actuating device 41 causes periodical shifting of the spring pressed dog 47 and a corresponding slight rotation of the ratchet wheel 48 and shaft 49 and hence of table feed screw 54. Table feed actuating mechanism 41 is adjustable as a unit and actuating arms 42 are separately adjustable to time the table feed actuation so as to occur substantially at the end of horizontal translation of the carriage 19.

In addition to the automatic feeding mechanism previously described, manual means are provided for raising and lowering the work table 16. These means take the form of a hand wheel 58 adapted to rotate the shaft 53 through the medium of intermeshing bevel gears 59 and 60.

Referring again to Figure 1, the knee 15 of the frame is provided with a table feed nut 61 in which the threaded portion of the table feed screw 54 is threadedly engaged. As will be evident, rotation of the shaft 53 and hence the feed screw 54 results in vertical adjustment of the table 16.

In Figures 4, 5 and 6 I have illustrated an attachment to the machine illustrated in Figures 1, 2 and 3 for imparting a crowning motion to the work spindle. As best seen in Figure 4, a plate 62 having an arcuate slot 63 of predetermined contour is attached to the disk 41 carried by the shaft 40. The link 43 pivoted as before at 44 is provided with an eccentrically adjustable roller 64 which is received within slot 63. Rotation of the shaft 40 which is occasioned through worm 32 and worm gear 36 as previously described results in a controlled oscillation of the lever 43 about its pivot point 44.

It will be understood that in order to bring about reversal of translation of the carriage 19 the motor 22 is reversed by suitable switching mechanism, which forms no part of the present invention.

A crowning plate 65 is attached to the ratchet wheel 48 and is secured thereto in adjustable position as by bolts 66. A mask element 67 having a portion 68 adapted to cover the ratchet teeth adjacent the spring pressed dog 47 is provided. Link 45 is pivotally secured to an actuator 69 which carries the spring pressed dog 47, and in addition a plunger 70 adapted to be received within the recess 71 in plate 65. Actuator 69 is freely supported for movement about the shaft 49 as indicated in Figure 6.

The spring pressed plunger 70 is connected to a control member 72 which may be shifted to cause plunger 70 to engage recess 71 or to be withdrawn therefrom as desired.

The mask 67 may be adjusted to render completely inactive the dog 47, or may be otherwise adjusted as will now be explained.

Assume first that the portion 68 is set to expose only one ratchet tooth on disk 48. Plunger 70 will be withdrawn from recess 71, and is adapted to ride over the smooth periphery of disk 65. Movement of the link 45 will be ineffective to cause elevation of the table until the carriage approaches the end of a stroke. At this time, the dog 47 will engage the ratchet wheel 48 and elevate the table, for example a thousandth of an inch. The table will remain stationary until the carriage approaches the opposite end of stroke, whereupon a further small up feed occurs. Ultimately the plunger 70 reaches recess 71 and drops therein as the table is again elevated. Further reciprocation of the table causes a gradual controlled up and down table feed. This results in crowning the ends only of the gear teeth, the gear and tool moving into a slight clearance relation in mid stroke of the carriage.

By adjusting the mask 67, the extent of the crowning action, measured centrally from each end of the gear teeth, may be controlled. If the mask 67 is adjusted so as to be entirely ineffective, crowning takes place, after engagement between the plunger 70 and recess 71, over the entire width (from end to end) of the gear teeth. The function of the plunger 70 and recess 71, when engaged, is to provide a down feed of table 16 on downward motion of link 45. When plunger 70 and recess 71 are engaged, solely upward feeding motion as opposed to alternately up and down crowning motion, is terminated.

With the mask 67 adjusted to render completely inoperative the spring pressed dog 47 and with the spring pressed plunger 70 shifted to engage the recess 71 of plate 65, the operation of the crowning attachment is as follows: The motor 22 rotates worm 32 and bevel gear 31. Rotation of the bevel gear 31 results eventually in rotation of carriage feed screw 34 and a corresponding horizontal translation of the carriage 19. Rotation of the worm 32 results in a timed slow rotation of the disk 41 and hence of the slotted cam plate 62. The follower 64 causes the lever 43 to be slowly oscillated about its axis 44 which results in a back and forward oscillation of the disk 65. Since the disk 65 is bolted or otherwise secured to the ratchet wheel 48 which in turn is keyed to the shaft 49, this results in a back and forth rotation of the table feed screw 54.

As will be apparent from an inspection of Figure 4, rotation of the table feed screw 54 reverses upon reversal of the motor 22, and in addition reverses as the follower 64 passes the midpoint of the slot 63. It will be understood of course that the cam plate 62 is adjusted so that the follower 64 is in mid-position between the ends of the slot 63 when the tool is engaged with the mid-portion of the teeth of the work gear. It will also be evident that by substituting cam plates for slots in various formations a crowning action predetermined as to amount of stock removal and extent from end to end of the work gear teeth may be obtained. When it is desired to omit the crowning motion and to return to automatic feed, cam plate 62 is removed and arms 42 are substitutued therefor. At the same time mask 67 is adjusted so as to render operative the spring pressed dog 47 and in addition actuating member 72 is shifted so as to disengage plunger 70 from recess 71.

In Figures 7 and 8 I have illustrated a modification of the crowning attachment. In place of providing a table feed nut 61 bolted to the knee 15 of the frame, I provide a movable feed screw nut 75 which is provided with flanges 76 and 77. The nut 75 is positioned in an aperture 78 formed in the top of the knee 15 and flange 76 is adapted to support the nut as shown in Figure 7. Pins 79 are provided on the knee 15 and engage in opposed recesses 80 formed in the flange 76. Pins 79 and recesses 80 prevent rotation of the nut 75 but permit vertical movement thereof. Received within the knee 15 is the actuating mechanism for shifting the nut 75. I have indicated this actuating mechanism as originating in a cam 81 which is driven in timed relation to translation. Cam 81, for example, may be rotated by appropriate mechanism including a flexible driving shaft, such as that indicated in Figure 10, later to be described.

As an alternative, if desired, link 45, previously referred to, may be extended downwardly and be appropriately connected to the shaft supporting the cam 81. Secured for vertical adjustment as by clamping means 82 and slot 83 I provide a bracket 84 on which is mounted for horizontal adjustment a pivot member 85. In Figure 7 I have indicated member 85 as slidable in suitable ways formed on a horizontal portion 86 of the bracket 84 and adjustable thereon by means of set screws 87. Pivot member 85 is provided with a pin 88. A lever 89 is provided at its mid-portion with an elongated slot 90 for the adjustable reception of the pivot pin 88. Lever 89 has a portion 91 adapted to engage cam 81. The opposite end of the lever 89 is bifurcated as indicated at 92, the two arms thus provided being adapted to engage the under surface of the flange 77.

As will be apparent upon rotation of cam 81 in timed relation to the horizontal translation of the carriage 19 the lever 89 will be oscillated about its pivot point 88. By adjusting the bracket 84 vertically the bifurcated arms 92 of the lever 89 may be in continuous engagement with the flange 77 which will result, as is obvious, in a continuous vertical movement of the nut 75 during translation. If desired the bracket 84 may be lowered so that the arms 92 engage the under surface of the flange 77 only adjacent the ends of the translation of the carriage. This will result in finishing a gear tooth which is crowned only for a predetermined amount adjacent the ends of its teeth.

By adjusting the pivot member 85 horizontally the amplitude of crowning motion may be adjusted. It will be understood that normally the crowning motion to be imparted is extremely slight, on the order of a few ten-thousandths of an inch.

It will be noted that the crowning adjustment imparted to the nut 75 results in a vertical adjustment of the table 16 and is entirely independent of the feed adjustment of the table which results from periodical actuation of the ratchet disk 48 by the spring pressed dog 47. Accordingly by means of the present embodiment a gear may be placed on the machine and the crowning attachment adjusted to impart a crowned effect of predetermined amount and extending over a predetermined portion of the gear teeth. Upon starting motor 22 the carriage 19 is reciprocated horizontally relative to the table 16 by means of the carriage feed screw 34. At this time the table 16 is moved vertically by movement of feed nut 75. At the end of each translation of the carriage 19 a feeding motion is superimposed on the table 16 by a slight abrupt rotation of the shaft 53 and table feed screw 54. As previously stated, automatic mechanism is provided to reverse the motor 22 at the end of each translation. Reversal of the motor initiates a reverse translation of the table which in turn results in a horizontal translation of the gear upon which is superimposed the crowning motion due to the vertical movement of the nut 75. Means are provided to continue translations a predetermined number of times and then to bring the entire mechanism to rest.

In Figure 9 I have illustrated a somewhat different embodiment of my invention in which the table feed nut 95 is supported for rotation on the knee 15. A lever 96 is pivoted as indicated at 97 to a vertically adjustable bracket 98. Springs 99 are provided to retain lever 96 in mid-position unless otherwise actuated. Attached to the lower end of the lever 96 is a pivoted link 100 which engages arm 101 operatively connected to adjusting worm 102. Nut 95 is provided at its periphery with a toothed portion adapted to mesh with worm 102. Adjustably carried by the horizontally movable carriage 19 are a pair of abutments 103 which are adjustable as indicated to control the extent of crowning action. The rate of crowning may be varied by vertically adjusting the bracket 98 to move the pivot point 97 relative to the ends of lever 96. Conventional means, such as an elongated slot in the lever 96 or a plurality of closely spaced apertures for receiving pivot pins may be provided to permit this adjustment.

It will be evident that upon horizontal translation of carriage 19 the lever 96 will be pivoted about the point 97. Through the medium of the link 100 the arm 101 will thus be rotated and cause a corresponding rotation of the worm 102. It will be noted that movement of the lever 96 in either direction from its mid-position results in the same movement of the worm 102.

In Figure 10 I have illustrated a somewhat different embodiment of my invention in which table feed screw 114 is carried by nut 115. The nut 115 rests upon a sleeve 116 which in turn is supported by lever 106 through pins 105. The lever is pivoted as indicated at 107 within the knee 15 and is engaged at its free end by cam 108. The cam is driven through the medium of bevel gears 109 and 110 from a flexible drive shaft 111 which in turn is connected to a shaft corresponding to shaft 37 (Figure 2) by means of bevel gears 112 and 113.

The contour of the cam is such that upon its rotation the lever 106 is effective to move the table feed nut vertically, thus imparting a corresponding motion to the feed screw 114 and thus imposing upon the horizontal translation of the carriage 19 the crowning movement. It will be understood that this crowning motion is superimposed without effecting the periodical feeding motion which results from intermittent slight rotation of the table feed screw 114 through the mechanism illustrated in Figures 2 and 3.

In Figure 11 I have shown a somewhat different mechanism for imparting a crowning motion to the table 16. A motor 120 is connected to a worm 121 adapted to mesh with worm gear teeth formed on the table feed nut 122. A switch 123 is carried by the table and is adapted to be engaged by adjustable abutments 124 carried by the carriage. Springs 125 normally retain the switch arm in intermediate position. Suitable means (not illustrated) is adapted to reverse rotation of the motor 120 upon reversal of translation of the carriage 19. If desired, the means for reversing motor 22 may be employed for this purpose. The switch actuated by the switch arm is constructed and arranged so that movement of the switch arm to intermediate position sets up a reversing circuit to the motor 120 such that upon actuation of the switch arm in the opposite direction the motor will be operated in a proper direction. This results in rotation of the motor 120 in a direction to elevate feed screw 54 during translation of the carriage 19 away from mid-position and an opposite rotation of the motor 120 to lower the feed screw 54 during translation of the carriage 19 to mid-position.

I have previously referred to the fact that by proper adjustment of the mask 67 the extent of the crowning, as measured from the ends of the teeth toward the center, may be controlled. In other words, if, for example, a gear has a width of two inches, the crowned surface may extend a half inch from each end, leaving the center portion of one inch in width uncrowned. This is important in many situations.

The method of crowning as employed by some of the other devices illustrated may be similar. Thus, for example, the type of crowning employed by the apparatus disclosed in Figure 7 may be the same. In other words, crowning may be limited to a predetermined distance from the ends of the gear teeth centrally, leaving the central portion of the gear teeth uncrowned. As will be obvious, this may be accomplished in this apparatus merely by contouring the cam 81 in accordance with the desired result. Specifically it will be accomplished by providing a circular portion having its center of curvature at the axis of the cam 81. In this particular apparatus the same result may also be accomplished, as previously stated, by lowering the bracket 84 so that the yoke 92 will contact member 77 only adjacent the ends of the stroke of translation.

The apparatus illustrated in Figure 10 is also adapted to be operated in accordance with this method. The structural modification will be merely the obvious modification of the cam 108 which will have a circular portion concentric with the axis of the cam effective during mid portion of the stroke.

A somewhat modified method is available and will be described in conjunction with the apparatus illustrated in Figures 7 and 10. In both of these, as will be readily understood, the elevation of the table is accomplished by a cam and lever device, the cam being driven in timed relation to translation.

In some cases it may be desired to provide a crowned surface which is nonuniform, such for example as one in which the crowning becomes more pronounced adjacent the ends of the crowned gear teeth. To accomplish this result the rate of relative infeed between the gear and tool, or more specifically the rate of elevation of the table carrying the gear in the apparatus illustrated, may be increased adjacent the end of translation relative to the rate of translation. In the present apparatus the rate of translation is substantially uniform, and this last mentioned result may therefore be accomplished by designing the cams 81 or 108 so that they have an increased lift per unit rotation at those portions of their surfaces which are engaged during the end of a stroke in translation.

This last specific method step may of course be combined with that previously mentioned, namely the provision of an intermediate uncrowned portion on the gear teeth. This would be accomplished, as is obvious, by the following method: Assume first that the translation is initiated from a mid position in which the tooth contact between the gear and cutter is substantially central of the gear teeth measured from end to end. The parts are rotated in mesh as in all cases and a relative translation between the two is provided in a direction which causes the tooth contact to shift toward one end of the gear teeth. The first portion of this translation is conducted without other relative feed so that a predetermined central portion of the gear teeth will be shaved accurately but without any crowning effect. At a predetermined point in the translation a relative feed between the gear and tool is superimposed on the translation and this relative feed is provided at an increasing rate as the tooth contact approaches the end of the teeth of the gear. This has the effect of rounding off the ends of the gear teeth and of providing a more pronounced effect at the ends of the gear teeth than at a point somewhat spaced from the ends of the gear teeth.

I have found that the crowned effect imparted to gears by this type of machine, namely one in which the axes of the work piece and tool are caused to proceed and recede in accordance with translation and without disturbing their orientation imparts a superior crowned effect to the gear teeth. The crowning appears as a uniform or non-uniform lowering of the profile adjacent the ends of the gear teeth.

The foregoing detailed description has been given for clearness and understanding only, and no unnecessary limitations should be understood therefrom, but the appended claims should be construed as broadly as permissible in view of the prior art.

What I claim as my invention is:

1. The method of crowning the teeth of a gear by rotating said gear in mesh at crossed axes with a gear-like tool, which comprises relatively translating said gear and tool in a direction to cause the tool to progressively contact the teeth of said gear from end to end, and gradually feeding said gear and tool toward each other as the contact between said gear and tool progresses from a mid-position on the teeth of said gear toward either end.

2. The method of machining the teeth of a gear by rotating said gear in mesh with a gear-like finishing tool, with the axes of said gear and tool lying in spaced parallel planes, and crossed at an angle of less than 30°, characterized by the steps of relatively translating said gear and tool in said planes and in a direction to cause contact between the teeth of said tool and gear to progress from end to end of said gear teeth, and superimposing on said relative translation a gradual relative feed between said gear and tool in a direction perpendicular to said planes in accordance with said translation, said gradual feed being in a direction to cause said gear and tool to approach as said contact progresses from a mid-position on said gear teeth toward either end.

3. The method of modifying the teeth of a gear in which the gear is rotated in mesh with a gear-like finishing tool, characterized by the steps of relatively moving said gear and tool in a direction to cause the contact between the teeth of said gear and tool to shift from a mid-position on the teeth of said gear to either end thereof, and gradually relatively moving the axes of said gear and tool toward each other during the first mentioned step so as to remove more material from the ends of said gear teeth than from the mid-portion thereof.

4. The method of crowning the teeth of a gear by rotating said gear in mesh at crossed axes with a gear-like tool, which comprises relatively translating said gear and tool in a direction to cause the tool to progressively contact the teeth of said gear from end to end, and gradually feeding said gear and tool toward each other without disturbing their orientation as the contact between said gear and tool progresses from a mid-position on the teeth of said gear toward either end.

5. The method of crowning the teeth of a gear by rotating said gear in mesh at crossed axes with a gear-like tool, which comprises relatively translating said gear and tool from a position in which the tool teeth contact the gear teeth substantially in mid-position in a direction to cause the contact to shift toward an end of said gear teeth, continuing said relative translation for a distance sufficient to finish the mid-portion of the gear teeth uniformly without crowning, and then gradually relatively feeding said gear and tool toward each other in accordance with continued translation until the contact between gear and tool teeth reaches the end of said gear teeth.

6. The method of crowning the teeth of a gear by rotating said gear in mesh at crossed axes with a gear-like tool, which comprises relatively translating said gear and tool at a substantially uniform rate from a position in which the tool teeth contact the gear teeth substantially in mid-position in a direction to cause the contact to shift toward an end of said gear teeth, to a position in which the tooth contact between the tool and gear reaches the end of the gear teeth, and superimposing on said relative translation a gradual relative feed of the gear and tool toward each other in timed relation to said translation and controlling the extent of the crowned surface produced by initiating the said relative feed at an intermediate point in said relative translation.

7. The method of crowning the teeth of a gear by rotating said gear in mesh at crossed axes with a gear-like tool, which comprises relatively translating said gear and tool at a substantially uniform rate from a position in which the tool teeth contact the gear teeth substantially in mid-position in a direction to cause the contact to shift toward an end of said gear teeth, to a position in which the tooth contact between the tool and gear reaches the end of the gear teeth, and superimposing on said relative translation a gradual relative feed of the gear and tool toward each other in timed relation to said translation and increasing the rate of said relative feed toward the end of said relative translation.

8. The method of crowning the teeth of a gear member which comprises meshing said gear member at limited crossed axes with a gear-like tool member, rotating one of said members directly and thereby driving the other member in rotation to effect a machining of the teeth of said gear member by the teeth of said tool member at the zone of contact therebetween, providing a slow relative reciprocation between said members in a plane parallel to the axes of both of said members to distribute the machining action longitudinally of the teeth of said gear member, and superimposing on said reciprocation a gradual relative feed between said members in a direction perpendicular to said plane, said feed being applied so as to cause the axes of said members to approach and separate gradually in timed relation to said reciprocation so as to produce gear teeth of varying thickness.

9. The method of crowning the teeth of a gear which comprises rotating a finishing tool having peripheral portions shaped to enter a tooth space of a gear to be crowned and to contact only limited areas of the sides of adjacent teeth thereof, said limited areas, as considered longitudinally of said teeth, being substantially less than the entire length thereof, positioning said gear relative to said tool such that said peripheral portions of said tool enter a tooth space of said gear, providing a relative translation between said gear and tool in a plane parallel to the axis of said gear to distribute the action of said tool longitudinally of the teeth of said gear, and superimposing on said translation a gradual relative feed between said gear and tool in a direction generally radial of said gear in timed relation to said translation.

10. The method of crowning the teeth of a gear which comprises rotating the gear in mesh at crossed axes with a gear-like tool, relatively translating the gear and tool to effect progress of the contact of the tool on the gear from end to end of the gear teeth, and relatively bodily moving the gear and tool away from and toward each other respectively during progress of the gear and tool contact from an end toward a mid-position of a tooth of the gear and during progress of the gear and tool contact from a mid-position toward an end of a tooth of the gear.

ROBERT S. DRUMMOND.